United States Patent [19]
Greer et al.

[11] Patent Number: 5,978,828
[45] Date of Patent: Nov. 2, 1999

[54] URL BOOKMARK UPDATE NOTIFICATION OF PAGE CONTENT OR LOCATION CHANGES

[75] Inventors: Paul E. Greer, Portland; Anand Pashupathy, Beaverton, both of Oreg.

[73] Assignee: Intel Corporation, Santa Clara, Calif.

[21] Appl. No.: 08/874,292

[22] Filed: Jun. 13, 1997

[51] Int. Cl.$^6$ ............................ G06F 17/30; G06F 13/38; G06F 15/167
[52] U.S. Cl. ....................... 709/2.24; 709/202; 709/203; 709/206; 709/217; 709/219; 709/224; 709/223; 707/10; 707/501; 707/511; 707/513; 707/530; 707/203
[58] Field of Search ............................ 707/501, 10, 511, 707/513, 530, 203, 202, 224, 206, 217, 219, 223; 345/329, 330, 331, 334, 333, 335

[56] References Cited

U.S. PATENT DOCUMENTS

| | | | |
|---|---|---|---|
| 5,796,393 | 8/1998 | MacNaughton et al. | 345/329 |
| 5,813,007 | 9/1998 | Nielsen | 395/200.36 |
| 5,835,712 | 11/1998 | Dufresne | 395/200.33 |

OTHER PUBLICATIONS

Thomas Bell and Fred Douglis, "An Internet Difference Engine and its Applications", IEEE, Compcon 96, 1996.
An Internet Difference Engine and Its Application, Thomas Bell and Fred Douglis., AT&T Bell Lab., Compcon'96 IEEE Computer Society Int'l Conference, Feb. 1996.
"Surfing Corporate Intranets," Zorn et al., Online, v21, May 1997.
Stepping Off the Wire; Surfing Without a Net, PC Week, p. 90, Oct. 1996.
NetAttache Enterprise Server, Enterprise Off–Line, Lenny Bailes, Computerworld, v31, n11, p. 89(2), Mar. 1997.
"Browser Booster", Lenny Bailes, Window Magazine, Mar. 1997.
Net–It Now! 1.5, PR Newswire, Feb. 1997.
Smart Bookmarks 2.0(TM), Aug. 1996.
Internet Mania, Corel Corporation, Nov. 1995.
Internet Access, Tierra Communication, Inc., Aug. 1996.
Tierra Highlights2, Tierra Communications, Inc., Jan. 1997.
New NAPro v.250e, 1996.
NetCarta Webmap, NetCarta Corporation, Nov. 1996.
Netscape Developer's Conference, M2 Presswire, Oct. 1996.

*Primary Examiner*—Frank J. Asta
*Assistant Examiner*—William C. Vaughn, Jr.
*Attorney, Agent, or Firm*—Blakely, Sokoloff, Taylor & Zafman LLP

[57] ABSTRACT

The present invention is an apparatus and method of providing notification of a content change of a web page. The method includes the steps of transmitting a request from a first electronic system to a second electronic system for a quotient value indicative of the content change, transmitting the quotient value from the second electronic system to the first electronic system, comparing the quotient value to a predetermined value to determine whether a threshold is triggered, and notifying the first electronic system of the content change if the threshold is triggered.

20 Claims, 5 Drawing Sheets

| | | | | | |
|---|---|---|---|---|---|
| 302 | 304 | 306 | 308 | 310 | |
| | | 0.5 | | | |

| 322 | 324 | 326 | 328 | 330 | 332 |
|---|---|---|---|---|---|
| 1 | Ad. Banner | | 0.5 | | |
| 2 | GIF | | 0.8 | | |
| 3 | Multi-media | | 1.0 | | |
| 4 | Text | | 1.0 | | |
| 5 | Frame | | 0.6 | | |
| 6 | Button | | 0.4 | | |

FIG. 5

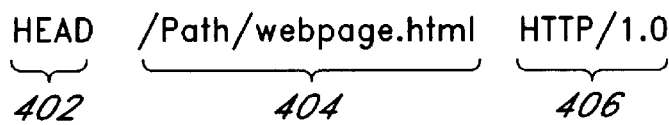

HEAD /Path/webpage.html HTTP/1.0
— 402 — 404 — 406 —
400

412 — HTTP/1.0 200 OK
414 — Server: Microsoft-IIs/2.0
416 — Date: Thu. 24 Oct 1996 14:51:29 GMT
418 — Last Modified: Fri, 18 Oct 1996 22:22:52 GMT
420 — Content-type: Text/html
430 — Update-Info:
  432
  434 — URL=
  436 — Revision=2
  438 — GQ=0.5, Date/Time
  440 — Q1=0.5, Ad Banner, Date/Time
         Q2=0.8, GIF, Date/Time
         Q3=1.0, Multi-Media, Date/Time
         Q4=1.0, Text, Date/Time
         Q5=0.6, Frame, Date/Time
         Q6=0.4, Button, Date/Time

FIG. 7

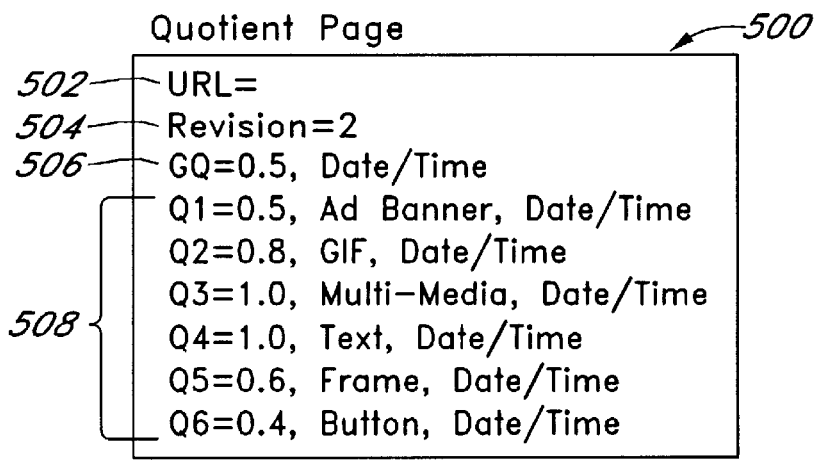

Quotient Page                    500

502 — URL=
504 — Revision=2
506 — GQ=0.5, Date/Time
508 — Q1=0.5, Ad Banner, Date/Time
       Q2=0.8, GIF, Date/Time
       Q3=1.0, Multi-Media, Date/Time
       Q4=1.0, Text, Date/Time
       Q5=0.6, Frame, Date/Time
       Q6=0.4, Button, Date/Time

FIG. 8

510 — GET /Path/webpage.html
512 — Accept: text/quotients
        — 514 —   — 516 —

URL BOOKMARK UPDATE NOTIFICATION OF PAGE CONTENT OR LOCATION CHANGES

BACKGROUND OF THE INVENTION

1. Field of the Invention

The present invention relates to the world wide web. More particularly, the present invention relates to providing update notification of Web page content or location changes.

2. Description of Related Art

The World Wide Web ("Web") is a massive collection of Web pages that are linked together by the Internet, the worlds largest public network. With the Web and the Internet, a user has access to a wealth of diverse and, in many instances, volatile information at his fingertips.

Today, the main piece of software used for connecting to and displaying Web pages on a client is called a Web browser. The main function of a Web browser is to interpret the information received from a Web page and display it on a computer monitor. Most of today's Web browsers have a feature called bookmark (or favorites). This feature allows a user to tag (or save) the address or Uniform Resource Locator ("URL") of a favorite Web page and add a short description of the Web page in an address book. The next time the user wants to connect to his favorite Web page, he selects the Web page from the address book without having to remember or type in the address. Thus, the bookmark feature gives the user a quick way of connecting to his favorite Web page.

However, with Web pages often being constantly updated with new information, there is no feature or mechanism that provides an indication of whether, when, or how much the contents of a Web page has changed. This is important because a user will want the most updated information of a Web page that he has saved or cached. The only way to determine whether a Web page has changed or changed significantly is to download the Web page. This may be a formidable task if the user wants to update several favorite Web pages saved or cached because the user has to download each Web page manually and determine whether the Web page has changed significantly enough to replace the old version.

Therefore, there is a need in the technology for an apparatus and method of providing update notification of Web page content or location changes using existing mechanisms.

SUMMARY OF THE INVENTION

The present invention is an apparatus and method of providing notification of a content change of a web page. The method includes the steps of transmitting a request from a first electronic system to a second electronic system for a quotient value indicative of the content change, transmitting the quotient value from the second electronic system to the first electronic system, comparing the quotient value to a predetermined value to determine whether a threshold is triggered, and notifying the first electronic system of the content change if the threshold is triggered.

BRIEF DESCRIPTION OF THE DRAWINGS

The features and advantages of the present invention will become apparent from the following detailed description of the present invention in which:

FIG. 5 illustrates a typical HEAD command request which is transmitted from a client to a server.

FIG. 6 illustrates a typical response message to the HEAD command request transmitted from a server to a client.

FIG. 7 illustrates another embodiment of providing update notification of Web page content or location changes.

FIG. 8 illustrates a request by a client to retrieve the quotient page of FIG. 7.

DESCRIPTION OF THE PREFERRED EMBODIMENT

The present invention relates to an apparatus and method of providing update notification of Web page content or location changes. As discussed herein, an "electronic system" is an apparatus including hardware and/or software for processing data. The electronic system may include, but is not limited to, a computer (e.g., laptop, desktop, server, mainframe, etc.), hard copy equipment (e.g., printer, plotter, fax machine, etc.), banking equipment (e.g., an automated teller machine), and the like. Moreover, a "memory element" is a device that is capable of storing data such as a software program. The memory element may include, but is not limited to, a storage disk (e.g., hard, floppy, compact, optical, etc.), Random Access Memory ("RAM"), Read Only Memory ("ROM"), non-volatile RAM, zip memory, and the like. A "communication link" refers to the channel of communication. The communication link may include, but is not limited to, a telephone line, a satellite connection, an Integrated Services Digital Network ("ISDN") line, an Ethernet connection, a coaxial connection, a fiber optic connection, and the like. Finally, as discussed herein, a Web page or HyperText Markup Language ("HTML") Web page is a data file on a server electronic system (also known as a content site) that contains information.

Figure 1:
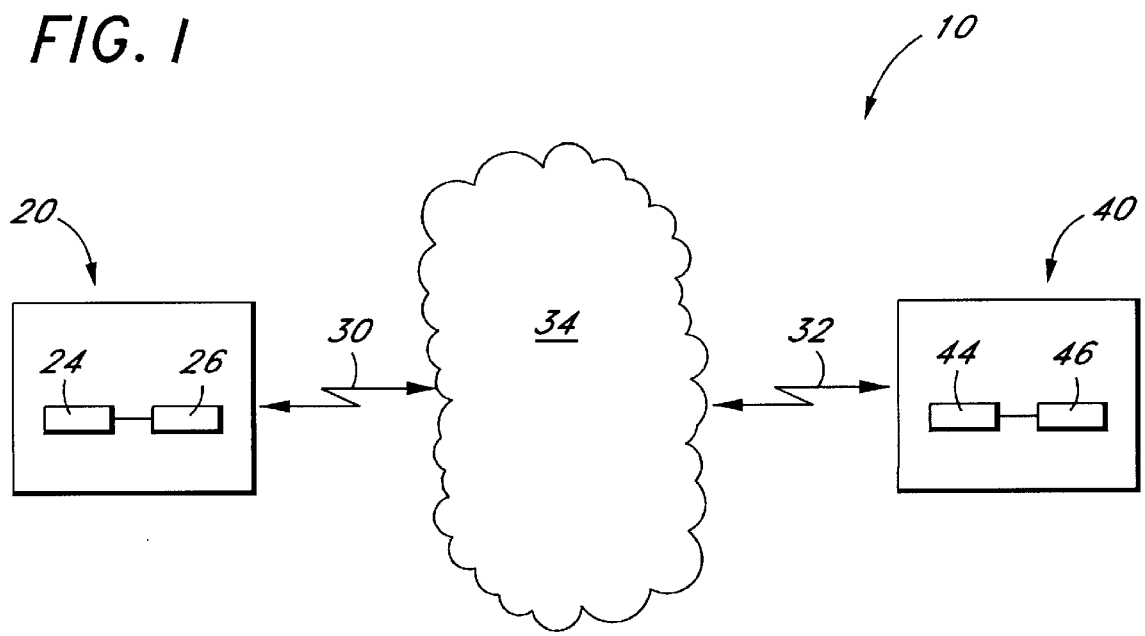
FIG. 1 illustrates one embodiment of an electronic system suitable for use with the present invention.

FIG. 1 illustrates one embodiment of an electronic system 10 suitable for use with the present invention. Referring to FIG. 1, the electronic system 10 includes a client electronic system 20, a server electronic system 40, and communication links 30 and 32 coupled to a network 34 (e.g., Internet). The communication links 30 and 32 couple the client electronic system 20 to the server electronic system 40 through the network 34. The client electronic system 20 includes a client processor 24 coupled to a client memory element 26 and server electronic system 40 includes a server processor 44 coupled to a server memory element 46. The client and server processors 24 and 44 execute application programs that are stored in the client and server memories 26 and 46, respectively. As discussed herein, a client electronic system is an electronic system that establishes connections for the purpose of transmitting requests and a server electronic system is an electronic system that accepts connections in order to service requests by transmitting responses. Moreover, a "client" is an application program that establishes connections for the purpose of sending requests and a "server" is an application program that accepts connections in order to service requests by sending back responses.

Figure 2:
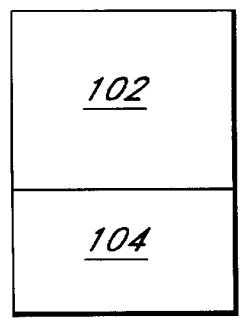
FIG. 2 illustrates an enhanced browser contained within the client memory element of FIG. 1.

FIG. 2 illustrates an enhanced browser 100 contained within the client memory element 26 of FIG. 1. Referring to FIGS. 1 and 2, client processor 24 executes the enhanced browser 100 which is contained within the client memory element 26. The enhanced browser 100 includes a browser 102 (e.g., Microsoft™ Internet Explorer™, Netscape Navigator™, etc.) and a browser enhancement 104. The browser 102 retrieves and formats Web pages for display on a user's screen or monitor. Implemented in client electronic system 20, the browser enhancement 104 augments the browser 102 with new capabilities suitable for use with the present invention. Among other things, the browser enhancement 104 includes a setup window having user assignable settings for retrieving update information of a Web page and determining whether the magnitude of change of the Web page warrants alerting the user of the updated information and/or automatically downloading the Web page. The browser enhancement 104 may be a module added to the browser 102. Alternatively, the browser enhancement 104 may be a stand-alone helper application, a browser "plug-in", a JAVA™ program, or an ActiveX control.

Figures 3, 4:
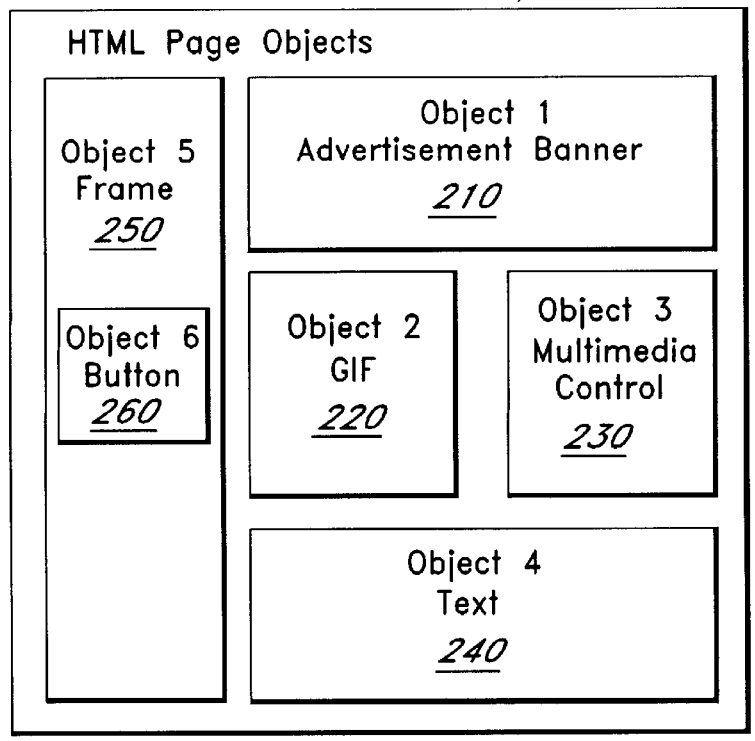
FIG. 3 illustrates a typical Web page contained within the server memory element of FIG. 1.
FIG. 4 illustrates an exemplary change control record contained within the server memory element of FIG. 1.

FIG. 3 illustrates a typical organization of a Web page 200 contained within the server memory element 46 of FIG. 1. Referring to FIG. 3, Web page 200 includes object 210 (e.g., advertisement banner), object 220 (e.g., graphics image format, "GIF"), object 230 (e.g., multimedia control), object 240 (e.g., text), object 250 (e.g., a frame), and object 260 (e.g., a button). Web page 200 may further include other types of objects such as HTML links, motion images, sound clips, HTML page tables, and other embedded objects (e.g., plug-ins, multimedia, etc.). Each Web page on the server electronic system 46 of FIG. 1 will have a corresponding change control record summarizing the changes of each Web page object. The server memory element 46 of FIG. 1 further includes a Web page change control database. The change control database is a database of all of the change control records.

FIG. 4 illustrates an exemplary change control record 300 contained within the server memory element 46 of FIG. 1. For sake of clarity, the Web page change control record 300 corresponds to the Web page 200 of FIG. 3. Referring to FIG. 4, Web page change control record 300 includes a Web page ID field 302, a Uniform Resource Locator ("URL") field 304, a global quotient field 306, a last update field 308, and a revision field 310. The Web page ID field 302 includes a unique identifier specifying that the change control record 300 corresponds to the Web page 200 of FIG. 2. The URL field 304 specifies whether the address of the Web page has changed and the new address of the Web page. The global quotient field 306 includes a global quotient value which specifies the magnitude of change of the overall Web page since the last update. The global quotient value ranges from 0.0, meaning no change, to 1.0, meaning a 100% change. The last update field 308 specifies the date and time of the most recent update of the Web page.

The revision field 310 includes a value that specifies the revision number of the Web page. When a Web page is created, the value in the revision field 310 will typically be 0. For every update of the Web page, this value will be changed to reflect the update (i.e., by some predetermined protocol). For example, the value in the revision field 310 will be changed to 5 after the fifth revision. There may be other fields defined in the Web page change control record 300 that provide more information regarding the updates of the Web page. By way of example, the Web page change control record 300 may include one or more other fields that specify the magnitude, revision number, and date and time of last modification of one or more previous major updates. The one or more fields will inform the user of intermediate major updates between the last update the user downloaded and the current update.

Continuing to refer to FIG. 4, Web page change control record 300 further includes one or more object fields 320 corresponding to the number of Web page objects. For instance, the Web page change control record 300 for the Web page 200 of FIG. 3 includes six object fields corresponding to each of the objects 210, 220, 230, 240, 250, and 260. In particular, each object field 320 includes an object number field 322, an object description field 324, a change control algorithm field 326, an object quotient field 328, a last update field 330, and unspecified fields 332. The object number field 322 specifies the name or number of the Web page object (e.g., 1, 2, etc.). The object description field 324 describes the Web page object such as the type (e.g., GIF) and size of the object, the nature of the change, and the like. The change control algorithm field 326 specifies the change control algorithm assigned to the object. The object quotient field 328 includes an object quotient value which specifies the magnitude of change of the particular object since the last update. This value is interpreted by a client filter contained within the client electronic system 20 of FIG. 1 (described below). The object quotient is a weighted average derived from the change control algorithm. The object quotient is always between 0.0 (no change) to 1.0 (100% change). The last update field 330 specifies the most recent update of that particular object. Finally, the unspecified fields 332 allows for expansion of new fields in the future.

In one embodiment, the change control algorithm in the change control algorithm field 330 is used to determine the object quotient value. To assign an object quotient value, an algorithm is used that matches the nature of the change. For example, an algorithm which deals with text will be different than one that deals with an embedded media object. This is because not all bytes are equal in value. This is also to insure that the algorithms chosen bring all the changes to a common ground and in tune with the object quotient values. The nature of the change is managed or represented by the algorithm chosen. For example, a text based algorithm could be assigned to calculate the key word associations weighted against the context of the overall idea in whose context the words are being used. An embedded image will have a total different algorithm than text. In one embodiment, there is a base line created for each page that will be the basis of comparison. The base line may be updated as the Web page is updated. As an illustration, each object type on a page is assigned a keyword or a description. The system will compare keywords and decide how much it has changed from the base line. The system has semantic knowledge associated with each article or each object in a page.

As part of the creation and updating of a Web page, the Web page author (or system administrator) may use server software tools (e.g., a script) to build and/or edit the Web page change control database 300. That is, the database creation/editing is associated with the creation and editing of the Web page. For example, using a change control algorithm, the Web page author assigns a global quotient value and a plurality of object quotient values and the categorical nature of each change for interpretation by a client filter running on the client electronic system 20 of FIG. 1. A server electronic system transmits this information to a client electronic system using a number of different methods as will be described below. In one embodiment, the quotient values are embedded into a HyperText Transfer Protocol ("HTTP") header of a Web page.

FIG. 5 illustrates a typical HEAD command request which is transmitted from a client electronic system to a server electronic system. The HEAD command (or method) request is defined in the HTTP/1.0 (and HTTP/1.1) specification (request for comment, "RFC" 1945) and specifies to a server to only return the header information for the indicated Web page. Referring to FIG. 4, the HEAD method request field 400 includes three sub-fields. The first sub-field 402 is the command HEAD which specifies to the server to retrieve only the header of a Web page and not the body. The second sub-field 404 specifies the location of the Web page. Finally, the third sub-field 406 specifies the protocol and version currently running on the client.

FIG. 6 illustrates a typical response message to the HEAD command request transmitted from a server electronic system to a client electronic system. Referring to FIG. 6, the response message 410 to the HEAD command request includes status field 412 which specifies the protocol and version that is supported, server field 414 which specifies the type and version of the server, time stamp field 416 which indicates the access date and time, last update field 418 which specifies the data and time of last modification of the Web page, and content-type field 420. The content-type field 420 specifies the media type (type/subtype) of the body of the Web page that is to follow (e.g., text/html). Media types are discussed in Multipurpose Internet Mail Extensions ("MIME"), as defined by the Internet Engineering Task Force Document, RFC 1521. Most of the information in the response message 410 is optional with the exception of the content-type field.

In addition, the response message 410 of the present invention includes a quotient field 430 which includes an identifier 432, an optional URL field 434, a revision field 436, a global quotient field 438, and one or more object quotient fields 440. In one embodiment, the information included in the quotient field 430 is obtained from a change control record contained within the server electronic system. The identifier 432 (e.g., Update-Info) identifies that web page update information is to follow. The optional URL field 434 is included in the quotient field 430 when the URL of the Web page has changed. The URL field 434 includes an identifier ("URL") followed by a new address of the Web page. If the address of the Web page has not changes, then typically nothing will follow the identifier. In such a case, this field may be excluded. The revision field 436 includes an identifier (e.g., "revision") followed by a revision value of the Web page which corresponds to the value in the revision field 310 of FIG. 4. The global quotient field 438 includes an identifier ("GQ") followed by a global quotient value and a date and time of last modification corresponding to fields 306 and 308 of FIG. 4, respectively.

Continuing to refer to FIG. 6, the one or more object quotient fields 440 include one or more object identifiers ("Qx") corresponding to the one or more objects in the Web page 200 of FIG. 3. Each object quotient identifier is followed by an object quotient value, an object type, and the date and time of last modification for that particular object. These values correspond to fields 328, 324, and 330 of FIG. 4 respectively. The global quotient value and all object quotient values, vary between 0.0 to 1.0 and each is set by the Web page creator/administrator. More specifically, the global quotient value indicates the magnitude of change for the entire Web page and each object quotient value indicates the magnitude of change for the corresponding object. The quotient field 430 can be added, inserted, or embedded into the response header 410. This process is performed either manually or by an automated process on the server electronic system 40 of FIG. 1. The quotient field 430 can also be generated and appended to the response header 410 on the fly (i.e., when a server receives a request for the header) by a server script.

FIG. 7 illustrates another embodiment of providing update notification of Web page content or location changes. In this embodiment, the quotient field 430 of FIG. 6 is added or inserted in a quotient page 500 rather than in the HTTP header of the Web page. The quotient page 500 and its contents are contained within the server memory element 46 of the server electronic system 40 as shown in FIG. 1. Referring to FIG. 7, the quotient page 500 includes an optional URL field 502 which includes a new address of the Web page when the URL of the Web page has changed, a revision field 504 which includes a value that specifies the revision of the Web page, and a global quotient field 506 which includes an identifier (e.g., "GQ") followed by a quotient value and a date and time of last modification. In addition, the quotient page 500 includes one or more object quotient fields 508. Each object quotient field includes an object identifier (e.g., "Qx") followed by the object quotient value, an object type, and a date and time of last modification for that particular object.

The quotient page 500 can be created/updated when the Web page is created/updated by the use of a script. When the Web page and Web page change control record are updated, a script can be used to update the quotient page 500 automatically. The script retrieves the information from the Web page change control record and inserts the information in the quotient page 500 as shown, for example, in FIG. 7. Alternatively, the quotient page 500 may be updated on-demand. That is, the information is only updated as requested by a client. It is contemplated that the quotient page 500 may contain other information.

The quotient page 500 is assigned a MIME type format so that a client can specifically request the quotient page 500 by the MIME type format. MIME describes the contents of a document by referring to a standardized list of document types organized by type and subtype. As part of the present invention, an exemplary new MIME type called "text/quotients" is created to identify and distinguish the quotient page 500 from the Web page 200. Although existing browsers may not be able to handle this new MIME type file format, the browsers typically launch helper applications (or browser plug-ins) that can handle the new file format. The browser enhancement 104 of FIG. 2 is such a helper application or browser plug-in.

FIG. 8 illustrates a request by a client to retrieve the quotient page 500 of FIG. 7. FIG. 8 includes a GET command request field 510 and a request header field 512. The GET command request specifies to a server to retrieve whatever information is identified by the request header field 512. The request header field 512 includes an identifier 514 followed by a type/subtype field 516. The identifier ("Accept") 514 indicates to the server the document types the client wants to receive. The type/subtype field 516 indicates to the server that the client wants to receive "text/quotients" document types. When the server receives the request field 510 and request header field 512, the server determines that the only acceptable media type is "text/quotients" and transmits the quotient page 500 of FIG. 7 rather than the Web page 200.

Figure 9:
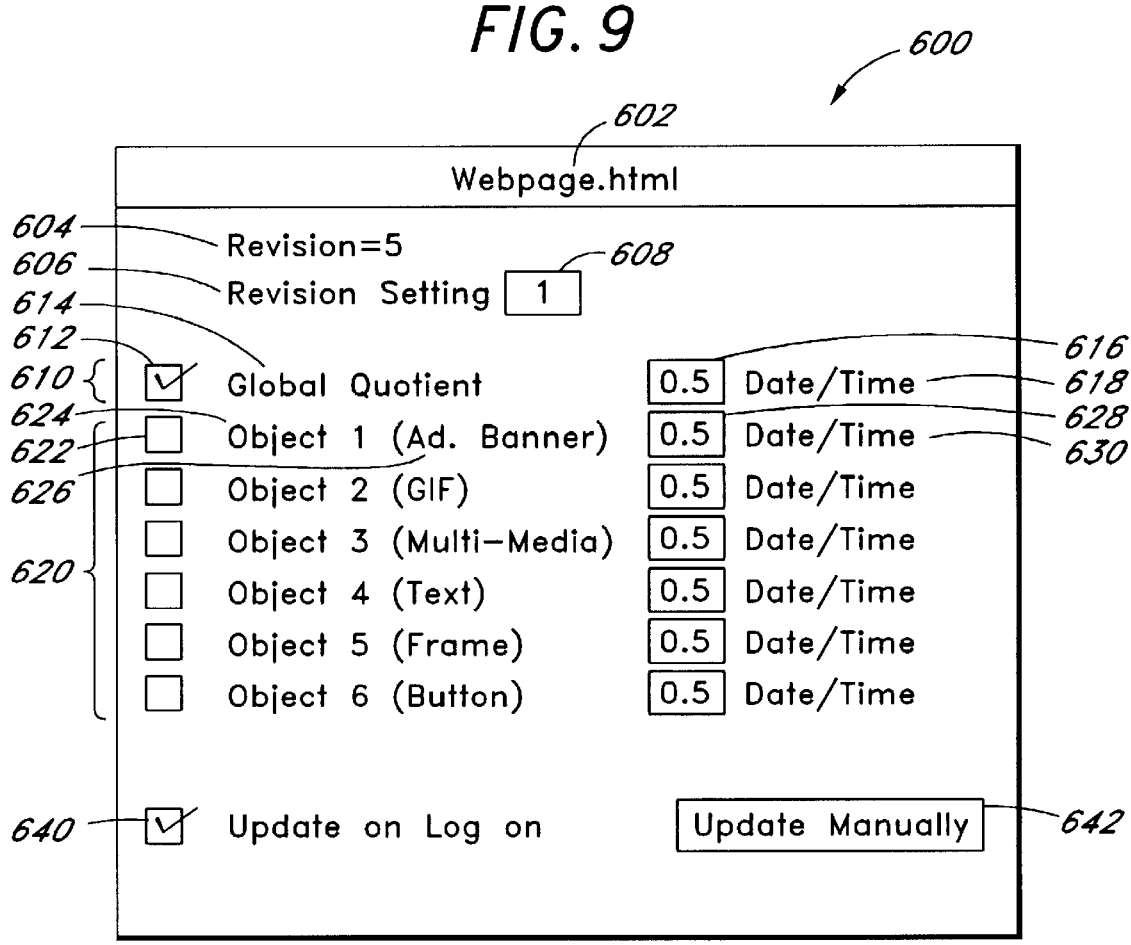
FIG. 9 illustrates a client filter setup window suitable for use with the present invention.

FIG. 9 illustrates a client filter setup window suitable for use with the present invention. Referring to FIG. 9, the software used to generate the setup window 600 is contained within and executed by the client memory element 26 and the client processor 24 respectively of FIG. 1. In one embodiment, the application program used to generate the setup window 600 is the browser enhancement 104 of FIG. 2. The setup window 600 includes a name field 602 which includes a URL or a description of a Web page. For sake of clarity, the setup window 600 will be described with respect to the Web page 200 of FIG. 3. The setup window further includes a global field 610 which includes the global quotient setting, and an object field 620 which includes the settings for each Web page object. In particular, the global field 610 includes a global enable box 612, an identifier 614 (e.g., "Global Quotient" or "Global Change Filter"), a global quotient filter setting 616 which specifies the global quotient filter value, and a global time field 618 which specifies the most recent date and time of modification of the Web page. The enable box 612, when selected, specifies to the client to compare the global quotient value with the filter value when update information is downloaded to the client.

The setup window 600 includes a revision field 604 which specifies the last revision of the Web page that was downloaded. The setup window 600 further includes field 606 having a user changeable value as shown in box 608. If the current revision minus the last revision (value in field 604) is greater than or equal to the value shown in box 608, then the Web page is automatically download. This gives the user flexibility in automatically downloading the Web page after the Web page has gone through a predetermined number of revisions. There may be other user changeable settings in the setup window 600 that allow the Web page to be automatically downloaded. For example, this may occur if an intermediate update has a large enough global quotient value (e.g., greater than the global quotient filter setting 616).

Still referring to FIG. 9, the object field 620 includes a plurality of object sub-fields corresponding to the number of Web page objects. Each object sub-field includes an object enable box 622, an object identifier 624 (e.g., "Object 1"), an object type field 626 which specifies the object type (e.g., text), an object quotient filter setting 628 which specifies the Web page object quotient filter value, and a time sub-field 630 which specifies the date and time of last modification of the Web page object. In addition, the setup window 600 includes an auto update log-on field 640 and a manual update field 642. If the auto update log-on field 640 is selected, the client obtains the updated information of the Web page every time a user logs on to the Internet. Two exemplary mechanisms for obtaining the update information of the Web page are shown and described in the description accompanying FIGS. 5–8. The manual update field 642 allows the user to manually invoke the client to obtain the update information of the Web page.

Once a Web page has been downloaded and stored or cached on a client electronic system, a user may tag the Web page for obtaining update information. This may be done by, for example, selecting a menu item in the client (e.g., enhanced browser 100 of FIG. 2) called "updates". Once the menu item is selected, a window such as the setup window 600 of FIG. 9 is displayed. The user can select the global enable box 612 and/or one or more of the object enable boxes 622 in order to request the client to obtain update information of the Web page. However, if the global enable box 612 and all of the object enable boxes are not selected, the client will not request for update information of the Web page. The user may request the client to obtain update information on log on (e.g., by selecting the enable box 640), manually (e.g., by selecting the manual update field 642), or periodically (e.g., every fifth log-on, beginning of the month, etc.).

Initially, the setup window 600 loads default values (e.g., 0.5) for the global quotient filter setting 616 and each of the object quotient filter settings 628. Moreover, initially, the object identifier 624, the object type 626, and the global and object time fields 618 and 630 are not known and will be updated once the client obtains the update information for the first time. The setup window 600 allows user assignment of filter values to determine what magnitude and categorical nature of the change will trigger a change alert to the user. The user can select a different threshold value for the global quotient filter setting 616 and each of the object quotient filter settings 628. For example, the user may only enable the global quotient filter setting 616 by selecting the global enable box 612. Alternatively, the user may only want to be notified when there is a 60% change to the text of the Web page 200 of FIG. 3. This is done by only selecting the object enable box 622 for object 4 and changing the filter value in the object quotient filter setting 628 to 0.6. The client can be set to poll one or more Web pages that have been tagged or cached. Moreover, the client filter values can be automatically tuned and adapted using intelligent software that tracks user preference traits by observing their Web browsing patterns.

The client filter will also scan the optional URL field, if any, to determine whether the address of the Web page has changed. If the address of the Web page has changed, then the client filter will alert the user of that fact, for example, by displaying a pop-up window. The user will be prompted and may choose to update the bookmarked/tagged URL with the updated URL and/or download the Web page.

Figure 10:
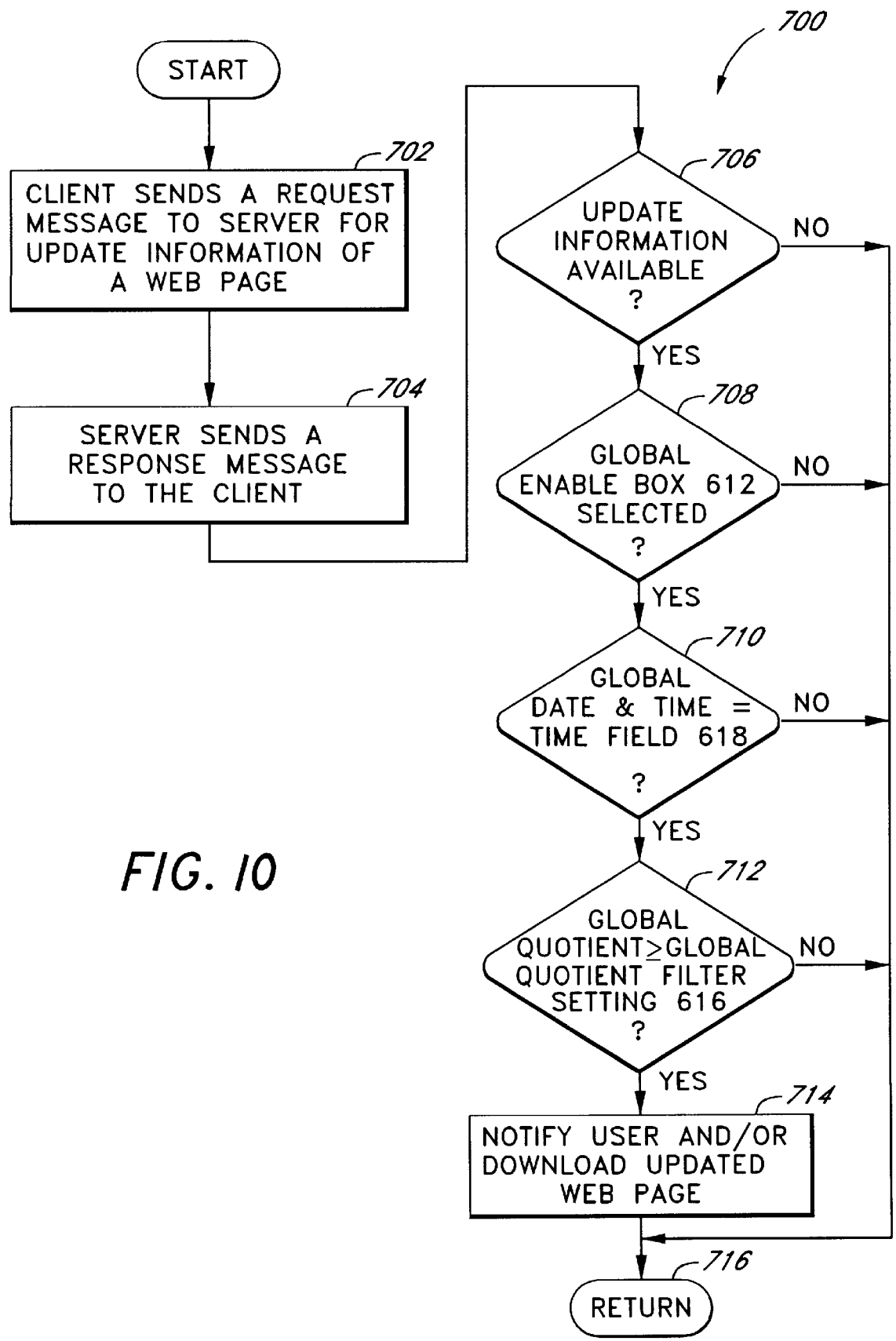
FIG. 10 is a flow diagram illustrating an exemplary method of obtaining update information of a Web page and notifying a user of the updated information.

FIG. 10 is a flow diagram illustrating an exemplary method of obtaining update information of a Web page and notifying a user of the updated information. Referring to the flow diagram 700, the process begins a Step 702 where a client sends a request message to a server for update information, if any, of a Web page located on the server. At Step 704, the server sends a response message to the client. At Step 706, if the response message includes update information, then the process continues to Step 708, otherwise the process is ended (Step 716). This may occur if a server does not include update information on Web pages contained within the server memory. Once the update information is obtained, the process determines whether the global enable box 612 of FIG. 9 is selected by a user (Step 708). If the global enable box 612 (or any of the object enable boxes 622) is/are selected, then the process proceeds to Step 710, otherwise the process is ended (Step 716). Assuming that only the global enable box 612 is selected, at Step 710, the process determines whether the global date and time of last modification included in the update information is equal to the global time field 618. If not, the process continues to Step 712, otherwise the process is ended (Step 716) meaning that the Web page has not been modified since the last time it was checked.

Continuing to refer to FIG. 10, at Step 712, if the global quotient value included in the update information is less than (e.g., or less than or equal to) the global quotient filter setting 616, then the process is ended (Step 716). This means that the magnitude of change was not high enough to warrant alerting the user and/or downloading the Web page. On the other hand, if the global quotient value is greater than or equal to (or just greater than) the global quotient filter setting 616, the process proceeds to Step 714. At Step 714, the process notifies the user by displaying a pop-up window. The process can also be configured to simply download the Web page in addition to or in lieu of notifying the user. Additionally, for each object enable box 622 that is selected, the process Steps 708–714 are performed for that particular object.

When notified of the updated information, a user, using the client (e.g., enhanced browser 102 of FIG. 2), can query the nature of the Web page changes, such as a change to the entire Web page or one or more objects in the Web page. In addition, the user can query the magnitude of the change, the categorical nature of the change (e.g., based on the user setting, the update is urgent, interesting, FYI), and the date and time of the change. The user can then update his PC with the updated Web page (i.e., update the old Web page cached or stored on a local memory with the new Web page).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of indicating a content change of a web page, comprising:

transmitting a request from a first electronic system to a second electronic system for a quotient value indicative of the content change of the web;

responsive to receiving the request, transmitting said quotient value from said second electronic system to said first electronic system;

said first electronic system comparing said quotient value to a predetermined value to determine whether a threshold is triggered; and transmitting a second request from said first electronic system to said second electronic system for the Web page if the threshold is triggered.

2. The method of claim 1 further comprising notifying said first electronic system of the content change if said threshold is triggered.

3. The method of claim 1 further comprising transmitting the web page from said second electronic system to said first electronic system.

4. The method of claim 1 wherein prior to transmitting said quotient value from said second electronic system to said first electronic system, the method comprises adding said quotient value to a HTTP header of the web page on said second electronic system.

5. The method of claim 4 wherein transmitting said request comprises transmitting a HEAD command request from said first electronic system to said second electronic system and wherein transmitting said quotient value comprises transmitting said HTTP header including said quotient value from said second electronic system to said first electronic system.

6. The method of claim 1 wherein prior to transmitting said quotient value, the method comprises adding said quotient value to a file on said second electronic system.

7. The method of claim 6 wherein transmitting said request comprises transmitting a GET command request from said first electronic system to said second electronic system and wherein transmitting said quotient value comprises transmitting said file including said quotient value from said second electronic system to said first electronic system.

8. The method of claim 1 wherein said quotient value ranges between 0.0 to 1.0 and said predetermined value is set between 0.0 to 1.0.

9. The method of claim 1 wherein comparing said quotient value to said predetermined value comprises determining whether said quotient value is greater than or equal to said predetermined value.

10. An electronic system that indicates a content change of a web page, comprising:

a communication link;

a first electronic system coupled to said communication link, said first electronic system includes a memory element having a file and a web page, said file includes a quotient value indicative of a magnitude of change of the web page, said first electronic system to transmit said file in response to a request, and to transmit said web page in response to a second request; and a second electronic system coupled to said communication link, said second electronic system to transmit said request to said first electronic system to retrieve said quotient value in said file, said second electronic system to transmit said second request to said first electronic system to retrieve said web page if said quotient value is greater than or equal to a predetermined value.

11. The electronic system of claim 10 wherein said file is a HTTP header of the web page.

12. The electronic system of claim 11 wherein said request is a HEAD command request.

13. The electronic system of claim 10 wherein said file is a quotient page of the web page.

14. The electronic system of claim 13 wherein said request is a GET command request.

15. A method of notifying a content change of a web page, having one or more objects, comprising:

transmitting a request from a first electronic system to a second electronic system for a file containing a global quotient and one or more object quotients, the global quotient and the one of more object quotients being indicative of a magnitude of change of the web page and the one or more objects, respectively;

responsive to receiving said request, transmitting the file from the second electronic system to the first electronic system;

said first electronic system comparing the global quotient to a predetermined global quotient value and the one or more object quotients to a corresponding one or more predetermined object quotient values to determine whether a threshold is triggered; and transmitting a second request from said first electronic system to said second electronic system for the web page if the threshold is triggered.

16. The method of claim 15 wherein prior to transmitting the file, the method comprises adding the global quotient and the one ore more object quotients to a HTTP header of the web page.

17. The method of claim 16 wherein transmitting said request comprises transmitting a HEAD command request from the first electronic system to the second electronic system and wherein transmitting the file comprises transmitting the HTTP header including the global quotient and the one or more object quotients from the second electronic system to the first electronic system.

18. The method of claim 15 wherein prior to transmitting the file, the method comprises adding the global quotient and the one or more object quotients to the file on the second electronic system.

19. The method of claim 18 wherein transmitting the request comprises transmitting a GET command request from the first electronic system to the second electronic system and wherein transmitting the file comprises transmitting the file including the global quotient and the one or more object quotients from the second electronic system to the first electronic system.

20. The method of claim 15 wherein comparing the global quotient to the predetermined global quotient value and the one or more object quotients to the corresponding one or more predetermined object quotient values to determine whether the threshold is triggered comprises determining whether the global quotient is greater than or equal to the predetermined global quotient value, and determine whether the one or more object quotients are greater than or equal to the corresponding one or more predetermined object quotient values, and wherein transmitting the second request comprises transmitting the second request from said first electronic system to said second electronic system if the global quotient is greater than or equal to the predetermined global quotient value or at least one of the one or more object quotients is greater than or equal to at least one of the corresponding one or more predetermined object quotient values.

\* \* \* \* \*